US005948498A

United States Patent [19]

Bianco et al.

[11] Patent Number: 5,948,498

[45] Date of Patent: Sep. 7, 1999

[54] MULTI-PURPOSE MESSAGE BOARD

[75] Inventors: Ronald M. Bianco, Laguna Beach; Douglas M. Jack, Fullerton, both of Calif.

[73] Assignee: Day Runner, Inc., Fullerton, Calif.

[21] Appl. No.: 08/861,546

[22] Filed: May 22, 1997

[51] Int. Cl.[6] ................................ B32B 3/08; B32B 9/06

[52] U.S. Cl. .................................... 428/81; 52/27; 52/38; 428/99; 428/192; 428/455; 428/537.5

[58] Field of Search ............................ 52/27, 38; 428/81, 428/99, 182, 455, 537.5

[56] References Cited

U.S. PATENT DOCUMENTS

| | | | |
|---|---|---|---|
| 2,513,239 | 6/1950 | Hatchett | 40/124.4 |
| 3,629,960 | 12/1971 | Roush | 434/429 |
| 4,028,827 | 6/1977 | Hufton | 428/900 X |
| 4,100,684 | 7/1978 | Berger | 434/417 |
| 4,362,248 | 12/1982 | Vilanova | 211/50 |
| 4,408,408 | 10/1983 | Eng | 428/99 X |
| 4,423,562 | 1/1984 | Nichols | 40/107 |
| 4,451,067 | 5/1984 | Williams | 40/124.4 X |
| 4,580,360 | 4/1986 | Gribb | 428/99 |
| 4,603,883 | 8/1986 | Barbieri et al. | 428/81 X |
| 4,616,755 | 10/1986 | Adolfsson | 211/87.01 |
| 4,654,906 | 4/1987 | Roberts | 428/81 X |
| 4,655,323 | 8/1997 | Lassoff | 40/611 |
| 4,703,571 | 11/1987 | McCarthy | 40/107 |
| 4,803,795 | 2/1989 | Questel et al. | 40/124.4 X |
| 4,905,388 | 3/1990 | Sinkow | 40/110 |
| 5,316,342 | 5/1994 | Almo | 40/107 X |
| 5,339,546 | 8/1994 | Rahwan | 40/107 |
| 5,427,254 | 6/1995 | Knieriem | 211/50 |
| 5,527,568 | 6/1996 | Boone et al. | 428/14 |
| 5,658,635 | 8/1997 | Davis et al. | 428/81 |

OTHER PUBLICATIONS

Various pages of wall calendars, wall planners, bulletin boards and marker boards (pp. 276–278,283–290, 654–655, 657–661).

*Primary Examiner*—Henry F. Epstein
*Attorney, Agent, or Firm*—Pretty, Schroeder & Poplawski

[57] ABSTRACT

A multi-purpose message board having a mounting panel and a plurality of spaces thereon with a multi-page permanent record unit, and a single sheet temporary record unit mounted in two of said spaces. The message board is formed of a single sheet of material with the spaces in the form of depressions molded in the single sheet, with the permanent record unit being a calendar with the pages wire bound at the top, and with the temporary record unit being a write on/wipe off plate or cork board. The mounting panel of the message board has a perimeter flange with a backboard having one surface mounted on the flange and magnets and eyelets carried on the other surface of the backboard. Containers are attached to the panel at some of the spaces. Containers may have a cup shape for holding articles and may have a frame for holding a note pad.

39 Claims, 3 Drawing Sheets

MULTI-PURPOSE MESSAGE BOARD

BACKGROUND OF THE INVENTION

This invention relates to calendars, message boards, note pads, dry erase boards, and the like. A variety of such items are in use but none of the products available meet all of the needs for a present day message board which can be utilized in various environments, such as being mounted on a wall or fixed panel and being mounted on a moving panel such as a refrigerator door or the like.

Accordingly, it is the object of the present invention to provide a new and improved message board having the various components desired, and at the same time being formed as a single panel with various attachments desired by the user, and being capable of mounting in various environments.

It is a particular object of the invention to provide a lightweight message board suitable for mounting on doors, including refrigerator doors, cabinet doors and the like and which is resistant to door slamming, pushing, and the various other forms of disturbances occurring in a typical kitchen or in a heavily trafficked doorway. Large horizontal bar magnets are used for direct mounting on steel doors. A pair of widely spaced eyelets also may be fixed to the back of the board to control swaying of the board on a moving door.

It is another object to provide such a message board which is lightweight and inexpensive, and at the same time durable and resistant to damage. The panel is a thin plastic sheet, typically formed by vacuum molding, with perimeter and interior borders which define mounting spaces for various components and at the same time provide structural rigidity.

It is a further object of the invention to provide in a message board, a plurality of components, including a permanent record unit, such as a calendar, a temporary record unit, such as a write on/wipe off panel or a corkboard, and a plurality of containers for various items. Preferably the write on/wipe off panel is of steel, providing a firm surface for writing and also a mounting surface for the widely used attachment magnets.

The containers may be deep and suitable for pencils and other writing instruments, may be wide and suitable for notes, letters, cards and coupons, and may have a frame for notepads, including the now widely used 3M Post-it notes.

Other objects, advantages, features and results will more fully appear in the following description.

SUMMARY OF THE INVENTION

A multi-purpose message board having a mounting panel and spacer means defining a plurality of spaces on the panel, a multi-page permanent record unit, and a single sheet temporary record unit, with first mounting means joining a first of the spaces and the permanent record unit, and second mounting means joining a second of the spaces and the temporary record unit. The message board may be formed of a single sheet of material with the spaces in the form of depressions moulded in the single sheet. Preferably the temporary record unit is a write on/wipe off plate or a corkboard, and the permanent record unit is a multi-page calendar with a binding which permits folding over of each sheet while retaining all the sheets in the binding.

Preferably the spaces are in the form of depressions moulded in the panel with forwardly projecting rims or shoulders defining the spaces. This construction limits lateral movement of the components positioned in the spaces.

Desirably the message board also includes page corner retainer tabs at each lower corner of the first space. When the board is mounted to a door, the tabs receive the lower corners of the permanent record unit to prevent pages from flying out when the door is opened and closed.

A support shaft for the permanent record unit may be positioned in the first space adjacent the center of the upper edge thereof, which shaft is positioned in an opening in the panel and held in place by a retainer clip. Desirably the permanent record unit is a pad of sheets, such as a calendar, with the sheets bound by a wire binding permitting turning of individual sheets over the binding, permanently retaining the sheets for record purposes, while providing for bringing a new sheet to the front as desired.

Also preferably the message board has a perimeter flange with a backboard having one surface mounted on the flange and with magnets carried on the other surface of the backboard for mounting on a steel surface.

The message board may include one or more containers attached to the panel in the spaces. One form of container has a closed bottom, front, and sides, and an open back, with the panel closing the open back. Another form of container has a frame with a forward edge and a rearward edge, a resilient back member carried adjacent the rearward edge and spaced retainer tabs carried adjacent the forward edge, defining an internal volume for receiving and retaining a note pad, with the resilient back pushing the note pad forward against the spaced retainer tabs as individual sheets are removed. A container has at least two spaced fingers projecting rearward from the container through retainer openings in the panel, with each of said fingers having an enlarged end, and at least one container clip positioned on the fingers over the enlarged ends maintaining the container in position on the panel.

DESCRIPTION OF THE PREFERRED EMBODIMENT

Figure 1:
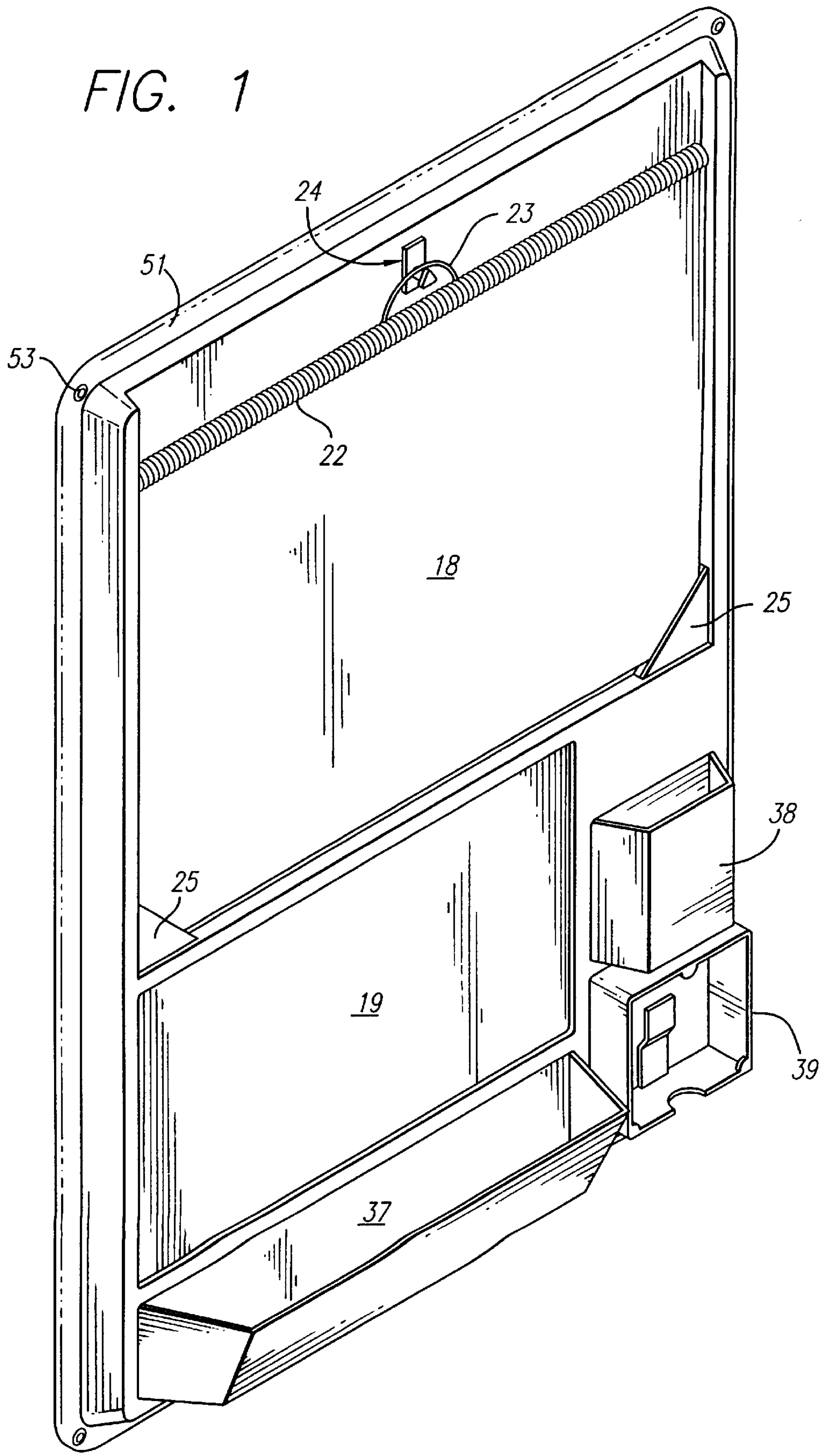
FIG. 1 is a perspective view of a multi-purpose message board incorporating the presently preferred embodiment of the invention.
Figure 2:
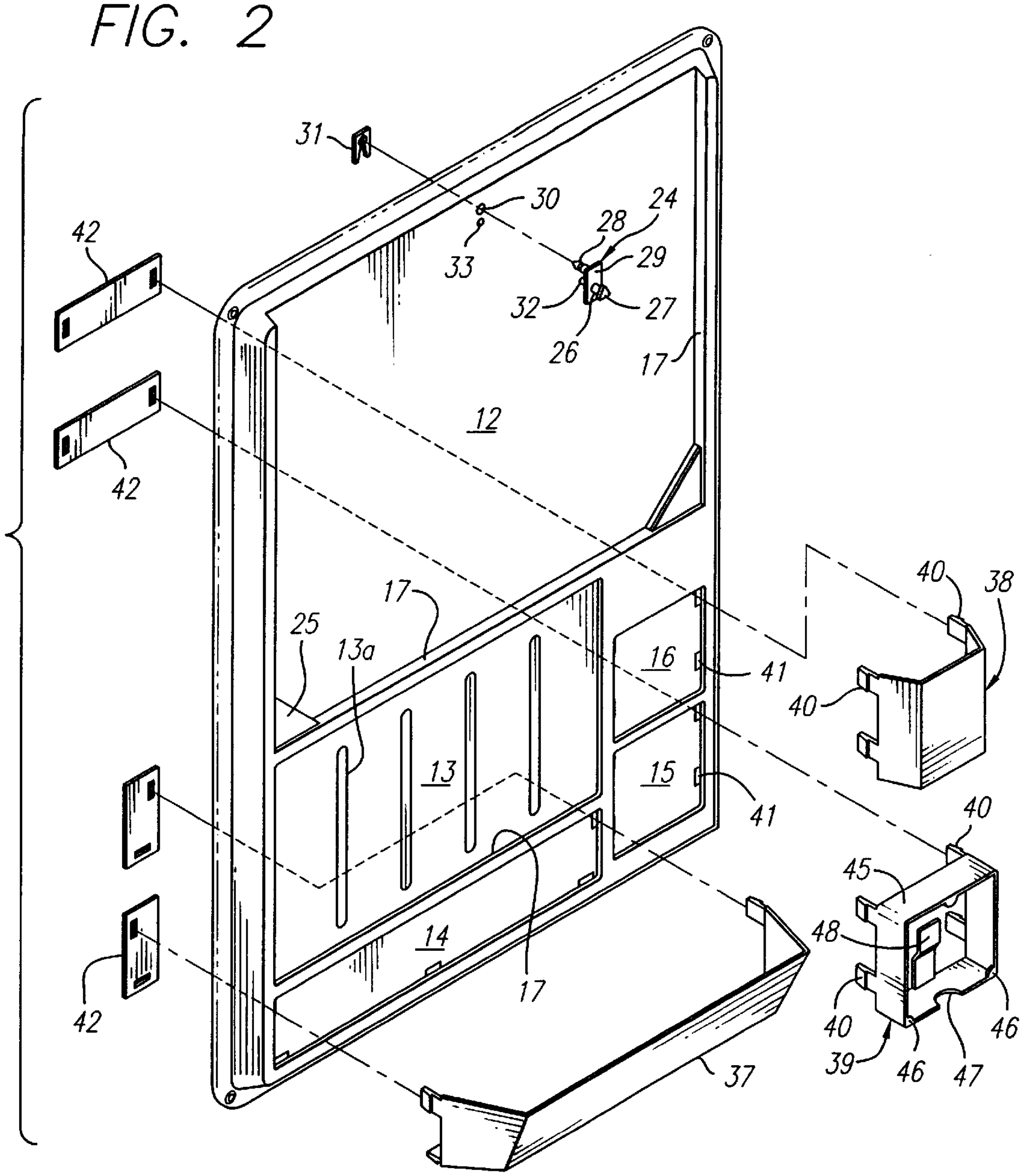
FIG. 2 is an exploded view of the message board of FIG. 1.

The presently preferred embodiment of the multi-purpose message board of the invention includes a mounting panel 11, and spaces 12, 13, 14, 15, and 16 in the panel. The panel may be formed of a single sheet of material, typically vacuum formed plastic or lightweight metal, such a aluminum, with the spaces in the form of depressions moulded in the single sheet with forwardly extending borders which function as spacers for defining the various spaces as recesses. These borders function as shoulders to restrict lateral movement of components positioned in the recessed spaces. A permanent record unit 18 is positioned in the space 12 and a temporary record unit 19 is positioned in the space 13. Preferably the panel is produced by vacuum forming of a thin sheet to provide a panel of high strength and low weight.

Typically, the permanent record unit is a multi-page pad, such as a calendar, which is bound at the top so that the individual pages are retained while the pages are turned over 360 degrees. Preferably, the binding is a wire binding 22 which readily provides this function. A mounting loop 23 may be provided at the center of the wire binding 22 for engaging a support 24 carried in the panel. Retainer tabs 25 may be positioned at each lower corner of the space 13, with the lower corners of the permanent record unit positioned behind these tabs. With this arrangement, the message board may be mounted on a door, such as a refrigerator door, a cabinet door, and the like which is swung open and closed many times. The retainer tabs keep the pages of the calendar or other record unit from flapping and becoming curled or otherwise damaged. If desired, the upper shoulder of the permanent record unit space 12 may be omitted for ease of page turning of the multi-page record unit. The wire binding permits turning individual sheets over 360 degrees and maintaining the sheets intact as a record, and still being viewable during use.

The support 24 may have a shaft 26, a first enlarged end member 27, a second enlarged end member 28, and an enlarged central member 29. The support is mounted in an opening 30 in the panel, with the enlarged end member 28 passing through the opening from the front of the panel and being held in place on the panel by a retainer clip 31. These components are dimensioned so that the enlarged central member rests against the forward side of the panel, with the shaft space between the end member 27 and the central member 29 receiving the loop 23 or other support used with the permanent record unit. If desired, a pin 32 may be provided on the enlarged central member 29 for positioning in an opening 33 in the panel to prevent rotation of the support member.

The temporary record unit 19 may be a panel having the conventional write on/wipe off surface, with this panel held in place in the space 13 by an adhesive. While the panel itself is permanently installed in the message board, the messages which can be written with the various forms of conventional write-on/wipe-off markers provide the temporary record feature.

In the presently preferred embodiment the record unit 19 may incorporate a steel plate to provide a stiff writing surface. Desirably a plurality of stiffer ribs 13*a* are provided in the space 13 of the panel to improve the rigidity. Also the steel plate permits attaching notes by magnets.

In another alternative embodiment the temporary record unit 19 may be a corkboard or the like providing for pinning notes to the panel.

One or more containers may be mounted on the message board, and three such containers 37, 38, and 39 are shown in the drawings. The containers 37 and 38 are cup or bowl shaped with a closed bottom, front and sides, and with an open back. They can be used for storing a wide range of items such as writing instruments, pins, clips, notes, cards, envelopes, coupons, etc. Means are provided for mounting the containers at spaces in the panel, with the panel providing the closed back resulting in a closed container except for the open top.

The preferred construction for mounting the containers on the panel includes spaced fingers 40 on the container which pass through mounting openings 41 in the panel and engage mating openings 43 in container clips 42. Preferably, each finger 40 has an enlarged end which is tapered to serve as a catch when the fingers, which are flexible, pass through the openings in the container clips. With this construction, containers can be removed from the panel by moving opposed fingers towards each other permitting removal of the container clip and then removal of the container. In addition, the container clips provide a large bearing surface that distributes the weight of the container and its contents over a wide area of the frame.

Another form of construction may be used for the container 39 having a frame 45 with top, bottom, right side and left side, with an open back and an open front. Fingers 40 are provided on the frame for mounting the container on the panel with container clips, in the same manner as the containers 37 and 38. This container 39 is particularly suited for retaining a note pad which may be bound at the top for easy removal of individual sheets. This container is especially suited for use with the paper note pads formed with a peelable adhesive on the upper portion of the back of each sheet of the pad, such as the Post-it notes provided by 3M. Desirably, one or more retainer tabs 46 are provided at the forward edge of the frame, with a resilient back member 48 carried at the back edge of the frame and projecting forward substantially to the front edge of the frame. With this arrangement, tabs 46 hold the note pad in place in the frame with the back member 48 pushing the pad forward against the tabs. If desired, a notch 47 can be provided in the bottom for ease of removal of individual sheets from the note pad.

Figure 5:
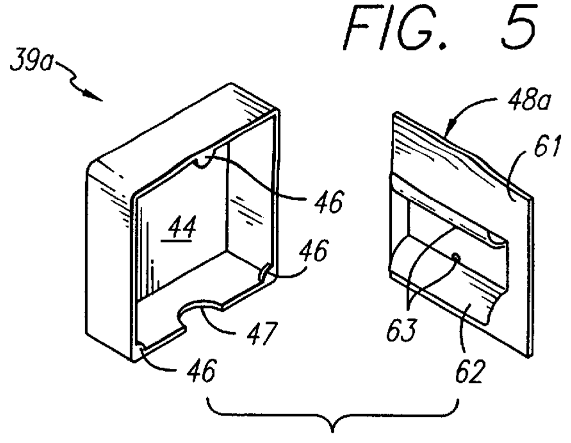
FIG. 5 is an exploded view of an alternative construction of the note pad container.
Figure 3:
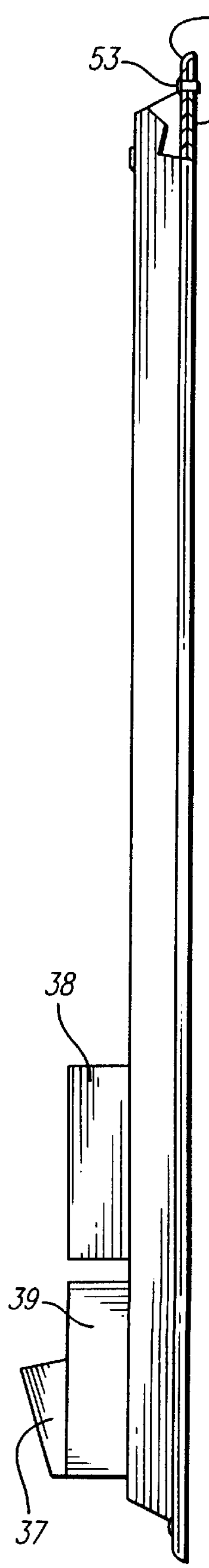
FIG. 3 is a side elevation, partly in section, of the message board of FIGS. 1 and 2.
Figure 4:
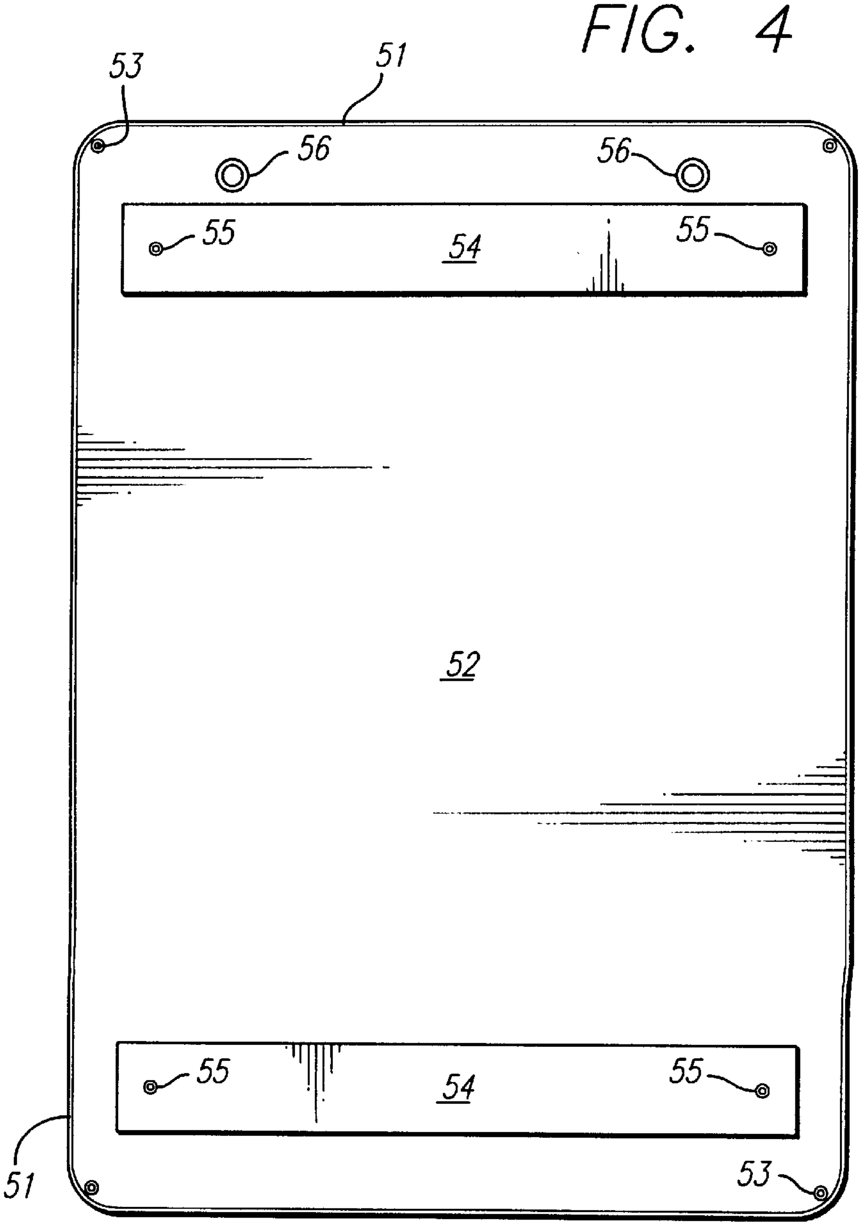
FIG. 4 is a back view of the message board.

An alternative embodiment for the container 39 is shown in FIG. 5 as 39*a*, having top, bottom, right side, left side, and a closed back 44. The frame 39*a* may have the retainer tabs 46 and the notch 37. This container 39*a* is attached to the panel in the space 16 by adhesive or heat bonding or otherwise as desired.

A resilient back member 48*a* comprising a plate 61 with a spring member 62 attached to the rear face of the plate 61. This attachment may be accomplished by molding two protrusion 63 on the rear face for positioning in mating holes in the spring member 62. The free ends of the protrusions are expanded, typically by heating, to retain the spring member in place.

Preferably, the mounting panel has a perimeter flange 51 which defines a space for receiving a backboard 52, typically of cardboard, with the backboard held in place on the panel by fasteners, such as rivets 53. One or more magnetic strips 54 are attached to the back surface of the cardboard, typically by rivets 55. Also, a pair of eyelets 56 may be provided in the backboard, near the upper edge of the backboard. The magnetic strips provide for supporting the message board on a steel panel or door or the like. Preferably the magnetic strips are wide, approaching the width of the panel for improved adhesion to a swinging door or plate. The eyelets provide for supporting the message board on a pair of hooks or nails or the like, as desired.

Swaying of components and jostling of contents of the containers are substantially controlled by the use of the eyelets for mounting the board. Swaying and jostling is also controlled by the shoulders in the panel which define the individual mounting spaces.

The particular width, height and depth of the various components can be varied as desired to provide any arrangement and form of the components. With the construction of the invention, the message board can be utilized for a variety of purposes, while requiring only a single mounting panel with provision for attaching various forms of record units and containers, and also providing for mounting on both fixed and moving surfaces and on steel surfaces and surfaces of other materials. The message board is also constructed to respond to a variety of forces and yet keep the contents of the message board in place.

We claim:

1. A multi-purpose message board having a mounting panel and spacer means defining a plurality of spaces on said panel, a multi-page permanent record unit, a single sheet temporary record unit, first mounting means joining a first of said spaces and said permanent record unit, and second mounting means joining a second of said spaces and said temporary record unit.

2. A message board as defined in claim 1 formed of a single sheet of material with said spaces in the form of depressions moulded in said single sheet of material.

3. A message board as defined in claim 2 wherein said permanent record unit comprises a plurality of pages bound at the top edge of the pages.

4. A message board as defined in claim 3 including page corner retainer tabs at each lower corner of said first space for receiving the lower corners of said plurality of pages.

5. A message board as defined in claim 4 wherein said permanent record unit pages are joined by a wire binding permitting turning of individual pages through 360 degrees.

6. A message board as defined in claim 5 including a support loop centrally positioned in said wire binding.

7. A message board as defined in claim 6 wherein said permanent record unit is a calendar.

8. A message board as defined in claim 6 wherein said mounting means includes a shaft having a first enlarged end member forward of the mounting panel such that the permanent record unit is removably retained on the shaft between the mounting panel and the first enlarged end member.

9. A message board as defined in claim 6 wherein said first mounting means is positioned in said first space adjacent the center of the upper edge of said first space.

10. A message board as defined in claim 9 wherein said first mounting means includes a shaft having first and second enlarged end members and an enlarged central member, and a retainer clip, with said first end member and enlarged central member located on opposite sides of the panel and said retainer clip on said shaft between said first end member and said panel, with said central member positioned at said panel and with said second end member projecting forward from said panel for removably retaining said permanent record unit on the shaft between said central member and said second end member.

11. A message board as defined in claim 10 further comprising a backboard mounted on said mounting panel and with magnetic support means carried on an outward facing surface of said backboard.

12. A message board as defined in claim 11 wherein said mounting panel has a perimeter flange with said backboard having one surface mounted on said flange.

13. A message board as defined in claim 1 including at least one container attached to said panel.

14. A message board as defined in claim 13 wherein said container has a closed bottom, front, and sides, and an open back, with said panel closing said open back.

15. A message board as defined in claim 14 wherein said container has at least two spaced fingers projecting rearward from said container open back through retainer openings in said panel, each of said fingers having an enlarged end, and at least one container clip positioned on said fingers over said enlarged ends between said enlarged ends and said mounting panel maintaining said container in position on said panel.

16. A message board as defined in claim 15 wherein said fingers are resilient and said enlarged ends are tapered to form a catch for said container clip.

17. A message board as defined in claim 15 including another container attached to said panel, said other container having a frame with a forward edge and a rearward edge, a resilient back member carried adjacent said rearward edge and spaced retainer tabs carried adjacent said forward edge, defining an internal volume for receiving and retaining a note pad, with said resilient back member pushing said note pad forward against said spaced retainer tabs.

18. A message board as defined in claim 1 including a container attached to said panel in one of said panel spaces, said container having a frame with a forward edge and a rearward edge, a resilient back member carried adjacent said rearward edge, and spaced retainer tabs carried adjacent said forward edge, defining an internal volume for receiving and retaining a note pad, with said resilient back member pushing said note pad forward against said spaced retainer tabs.

19. A message board as defined in claim 18 wherein said container has at least two spaced fingers projecting rearward from said container frame through retainer openings in said panel, each of said fingers having an enlarged end, and at least one container clip positioned on said fingers over said enlarged ends between said enlarged ends and said mounting panel maintaining said container in position on said panel.

20. A message board as defined in claim 18 wherein said fingers are resilient and said enlarged ends are tapered to form a catch for said container clip.

21. A message board as defined in claim 1 including a container attached to said panel in one of said spaces, said container having a frame with an open front, with a plate positioned in said container, said plate having rearwardly extending spring means, and said frame having spaced retainer tabs adjacent the front of said frame for retaining said plate within said container.

22. A message board as defined in claim 1 wherein said spaces are vacuum formed in said panel.

23. A message board as defined in claim 1 wherein said temporary record unit includes a metal plate.

24. A message board as defined in claim 1 wherein said temporary record unit includes a corkboard.

25. A multi-purpose message board having a mounting panel and spacer means defining a plurality of spaces on said panel, with said panel formed of a single sheet of material with said spaces in the form of depressions molded in said single sheet, a multi-page permanent record unit, a single sheet temporary record unit, first mounting means joining a first of said spaces and said permanent record unit, second mounting means joining a second of said spaces and said temporary record unit, with said permanent record unit in the form of a calendar comprising a plurality of pages joined by a wire binding permitting turning of individual pages through 360 degrees, and with a support loop centrally positioned in said wire binding, page corner retainer tabs at each lower corner of said first space for receiving the lower corners of said permanent record unit, said first mounting means including support means for said permanent record unit positioned in said first space adjacent the center of the upper edge of said first space and including a shaft having first and second enlarged end members and an enlarged central member, and a retainer clip, with said first end member passing through an opening in said panel for receiving said retainer clip on said shaft between said first end member and said panel, with said central member positioned at said panel and with said second end member projecting forward from said panel for removably retaining said permanent record unit, at least one container attached to said panel, said container having a closed bottom, front, and sides, and an open back, with said panel closing said open back, said one container having at least two spaced fingers projecting rearward from the container through retainer openings in said panel, each of said fingers having an enlarged end, and at least one container clip positioned on said fingers over said enlarged ends maintaining the container in position on said panel, with said fingers being resilient and said enlarged ends being tapered to form a catch for said container clip, and another container attached to said panel in another of said panel spaces, and having a frame with an open front and spaced retainer tabs carried adjacent the front of said frame, defining an internal volume for receiving and retaining a note pad, said other container including a plate within said frame, said plate having a spring member urging said plate toward the note pad and said front of said frame.

26. A message board as defined in claim 25 wherein said mounting panel has a perimeter flange with a backboard having one surface mounted on said flange and with magnetic support means carried on the other surface of said backboard.

27. A multi-purpose message board having a mounting panel formed of a single sheet of material, a multi-page permanent record unit, a single sheet temporary record unit, first mounting means for supporting said permanent record unit on said panel, second mounting means for supporting said temporary record unit on said panel, at least one container attached to said panel and having a closed bottom, front, and sides, and an open back, with said panel closing said open back, with said mounting panel having a perimeter flange with a backboard having one surface mounted on said flange, and magnetic support means carried on the other surface of said backboard.

28. A multipurpose message board comprising:

a vacuum-formed plastic sheet that serves as a mounting panel, the panel having a generally rectangular configuration and having a top edge and a front face, the front face defining recesses bounded by shoulders, there being a permanent record recess adjacent the top edge, and at least one temporary record recess arranged below the permanent record recess;

a permanent record in the form of a multi-page calendar disposed within the permanent record recess;

a first temporary record medium having a write on/wipe off surface supported by the mounting panel;

a second temporary record medium in the form of a pad disposed within the temporary record recesses; and a cork board attached to the front face of the mounting panel below the permanent record recess.

29. The message board of claim 28 further comprising means for hanging the message board.

30. The message board of claim 28 further comprising:

a backboard secured to the mounting panel on the side thereof opposite the front face; and means attached to the backboard for hanging the message board.

31. The message board of claim 28 further comprising:

a backboard made of cardboard secured to the mounting panel on the side thereof opposite the front face; and a plurality of magnetic strips attached to the backing board by which the message board can be hung.

32. The message board of claim 28 wherein the temporary record medium in the form of a write on/wipe off surface is disposed within a temporary record recess.

33. The message board of claim 28 wherein the mounting panel further defines at least one compartment for holding a writing instrument.

34. A multipurpose message board comprising:

a vacuum-formed plastic sheet that serves as a mounting panel, the panel having a generally rectangular configuration and having a top edge and a front face, the front face defining recesses bounded by shoulders, there being a generally rectangular permanent record recess adjacent the top edge, and a plurality of generally rectangular temporary record recesses arranged below the permanent record recess, the mounting panel further defining at least one compartment for holding a writing instrument;

a permanent record in the form of a multi-page calendar disposed within the permanent record recess, the calendar being bound along a top edge thereof by a spiral wire;

a first temporary record medium having a write on/wipe off surface disposed within one of the temporary record recesses;

a second temporary record medium in the form of a pad disposed within one of the temporary record recesses;

a longitudinal cork board attached to the front face of the mounting panel below the permanent record recesses;

a backboard made of cardboard secured to the mounting panel on the side thereof opposite the front face;

a plurality of apertures in the backboard by which the message board can be hung; and a plurality of magnetic strips attached to the backboard by which the message board can be hung.

35. A multipurpose message board comprising:

a vacuum-formed plastic sheet that serves as a mounting panel, the panel having a generally rectangular configuration and having a top edge and a front face, the front face defining recesses bounded by shoulders, there being a permanent record recess adjacent the top edge, and at least one temporary record recess arranged below the permanent record recess farther from said top edge than said permanent record recess;

a permanent record in the form of a multi-page calendar disposed within the permanent record recess;

a first temporary record medium having a write on/wipe off surface supported by the mounting panel;

a second temporary record medium in the form of a pad disposed within the temporary record recesses; and a cork board attached to the front face of the mounting panel below the permanent record recess.

36. The message board of claim 35 further comprising:

a backboard secured to the mounting panel on the side thereof opposite the front face; and means attached to the backboard for hanging the message board.

37. The message board of claim 35 further comprising:

a backboard made of cardboard secured to the mounting panel on the side thereof opposite the front face; and a plurality of magnetic strips attached to the backing board by which the message board can be hung.

38. The message board of claim 35 wherein the temporary record medium in the form of a write on/wipe off surface is disposed within a temporary record recess.

39. A multipurpose message board comprising:

a vacuum-formed plastic sheet that serves as a mounting panel, the panel having a generally rectangular configuration and having a top edge and a front face, the front face defining recesses bounded by shoulders, there being a generally rectangular permanent record recess adjacent the top edge, and a plurality of generally rectangular temporary record recesses, the mounting panel further defining at least one compartment for holding a writing instrument;

a permanent record in the form of a multi-page calendar disposed within the permanent record recess, the calendar being bound along a top edge thereof by a spiral wire;

a first temporary record medium having a write on/wipe off surface disposed within one of the temporary record recesses;

a second temporary record medium in the form of a pad disposed within one of the temporary record recesses;

a longitudinal cork board attached to the front face of the mounting panel below the permanent record recesses; and a backboard made of cardboard secured to the mounting panel on the side thereof opposite the front face.

* * * * *